May 9, 1933.  A. L. STIGEN  1,907,605
PROCESS FOR PREPARING MILK FOR TESTING
Filed April 27, 1932
FIG. 1.
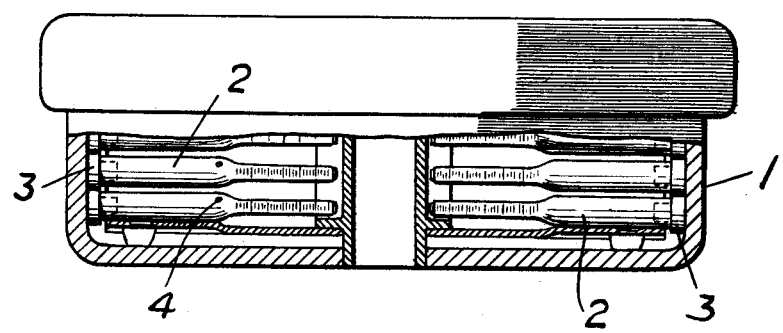
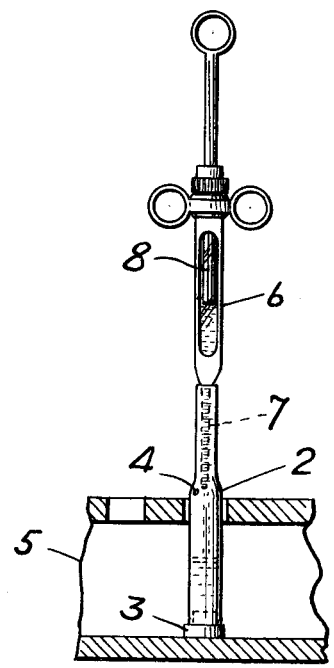
FIG. 2.
WITNESS:
INVENTOR
Alf Lennart Stigen
BY
Busser and Harding
ATTORNEYS.

Patented May 9, 1933

1,907,605

UNITED STATES PATENT OFFICE

ALF LENNART STIGEN, OF STOCKHOLM, SWEDEN, ASSIGNOR TO THE DE LAVAL SEPARATOR COMPANY, OF NEW YORK, N. Y., A CORPORATION OF NEW JERSEY

PROCESS FOR PREPARING MILK FOR TESTING

Application filed April 27, 1932, Serial No. 607,681, and in Sweden April 8, 1931.

It is known in the art to determine the content of fat in milk and milk products by means of several methods according to which a certain quantity of milk is introduced into a container together with a suitable solvent which dissolves all of the constituents of the milk with the exception of the fat. At one end the container has a narrow graduated tube. The container is placed in a centrifugal drum with the graduated portion pointing toward the centre, so that the fat during the rotation wholly or partly settles in the graduated part of the tester.

According to one known method the solvent consists of sulphuric acid. The container used for the determination is open at both ends, the wider opening being shut by means of a rubber stopper, whereas the narrow opening of the graduated part is open. During the centrifugation hot water is at first introduced into the centrifugal drum. The water partly surrounds the testers and partly penetrates into the same through a small hole in its longitudinal wall, the testers thereby being filled with liquid, which forces the fat into the graduated tube. In this way practically the same pressure is maintained inside the tube as outside it, so that the risk of the testers being blown up is avoided. After a certain time has elapsed cold water is introduced into the centrifugal drum, the purpose of this being to chill down the fat to the temperature at which it solidifies, as it would otherwise flow out of the testers when the level of the water becomes more nearly horizontal during the braking of the bowl. The solid fat column also facilitates taking the reading; and the testers may also be kept and the reading taken a long time after making the test, which enables the first reading to be checked at any time.

The method is very suitable for mass determination of the fat content owing partly to the possibility of placing a great number of testers in the centrifuge (at present centrifugal drums adapted to hold 80 testers are in use), and partly to its cheapness. The cost of the reagent according to this method is not one-tenth that of other methods. Notwithstanding these advantages the method has not, however, gone into considerable use except in Sweden, since its satisfactory operation depends on the treatment of an exact predetermined quantity of milk to be tested. This quantity is many times smaller than the quantity tested by other methods, and a high degree of skill is required to introduce this precise quantity into the tester. Heretofore a pipette has been used for measuring the milk, but it has been found that due to the way in which different persons blow out the last residue of the milk the variations in the quantity introduced are greater than is allowable.

The present invention comprises an improvement in the way of introducing the milk into the tester whereby the introduction of a precise predetermined quantity of milk will be insured without the exercise of a high degree of manual skill and at the same time the testing may be accurately effected with a smaller quantity of milk, and whereby the necessity of shaking the milk to insure thorough admixture with the sulfuric acid may be dispensed with and splashing of the sulfuric acid may be avoided.

In the accompanying drawing, Fig. 1 is a cross-sectional view of a centrifugal drum with the testers in position therein. Fig. 2 is a view of a preferred embodiment of the "squirt" by means of which the milk is introduced to a tester, the same being shown in operative relation with the tester.

In Figure 1 the testing tubes 2 are shown in operative position in the drum of a centrifuge 1. The wide ends of the tubes are shown closed by rubber stoppers 3, which prevent the mixture of milk and reagent from leaking out of the drum during rotation. The squirt is shown in Fig. 2. It comprises a relatively wide body portion 6, an elongated discharge neck 7 of very narrow diameter, and a piston 8 which is retractible to enable a definite quantity of milk to be pulled into the squirt by suction and which, when pushed forward, ejects the milk. The neck of the squirt is graduated to measure the quantity of milk sucked thereinto, or the piston may be made retractible a limited definite distance to insure the sucking in of a definite quantity of milk.

Up to the present time it has been common practice to blow in the milk by means of the pipette through the open wide end of the container into the previously measured quantity of sulphuric acid, which is prevented from escaping by keeping the thumb and the forefinger over the fine hole 4 and the open end of the graduated neck of the testing tube. After the milk has been blown in, the rubber stopper 3 is put into position, and the contents are mixed by shaking. In the procedure according to the present invention, the sulphuric acid can be introduced either in the usual manner, that is, through the large end, or by means of a syringe through the graduated tube of the tester, the wide end of the container being closed by the rubber stopper. The milk is then introduced through the graduated tube of the tester by means of the milk squirt. The latter must of course be so carefully made that considerable deviations from the prescribed quantity of milk cannot occur. It is desirable to give such a length to the neck of the squirt that it extends through substantially the entire length of the graduated tube down into the wide body of the container. It is also desirable, if not necessary, to make the neck of the squirt, or at least the delivery opening therefrom, so comparatively narrow that a very fine delivery jet is obtained which hits the sulphuric acid with great force, and thereby is atomized so that an instantaneous dissolution of the milk in the sulphuric acid is obtained. For measuring out the sulphuric acid it is suitable to use a syringe of about the same type, the pipe of which can be introduced through the graduated tube. As it is not necessary to determine the quantity of the sulphuric acid with the same degree of accuracy, this syringe can be made less carefully; or the sulphuric acid may be introduced in the known way.

According to the improved method considerable advantages are gained. By using the carefully graduated squirt for measuring the milk there is avoided the great uncertainty inherent in the method involving the use of a common pipette. It is thereby possible to obtain quite the same accuracy with a smaller amount of milk as with other methods requiring a greater quantity of milk and involving the use of a pipette. The advantages of the method for mass determinations are made manifest by the fact that a great number of testers, preferably the number which can be placed in the centrifuge, with the rubber stoppers 3 inserted, can be placed on the vertical stand 5. Thereupon, and without disturbing or manipulating the testers, a suitable quantity of sulphuric acid is at first introduced by means of a syringe, and then the fixed quantity of milk is introduced from the different milk samples by means of the squirt. By dimensioning the pipe of the squirt as above described, shaking of the milk can be dispensed with. Further, the danger that the sulphuric acid may splash, which has had to be reckoned with, is entirely avoided. The method also necessitates a much small degree of manual skill than is the case with the method heretofore used.

What I claim and desire to protect by Letters Patent is:

1. In the known method of testing milk which comprises dissolving the non-fat constituents in a solvent and the subjection of the mixed solution and fat, while contained in a container having a narrow, graduated, tubular neck, to centrifugal force, the process which comprises first introducing the sulphuric acid into the container and then isolating a predetermined quantity of milk and effecting the introduction of the milk into the container and its thorough admixture with the solvent by directing said milk in a fine jet, from a point within the container and distant from the open end of said graduated, tubular neck, toward the opposite wide extremity of the container.

2. In the known method of testing milk which comprises dissolving the non-fat constituents in a solvent and the subjection of the mixed solution and fat, while contained in a container having a narrow, graduated, tubular neck, to centrifugal force, the process which comprises first introducing the sulphuric acid into the container and then isolating a predetermined quantity of milk and effecting the introduction of the milk into the container and its thorough admixture with the solvent by directing said milk in a fine jet, from a point adjacent the junction of the body of the container and its graduated, tubular neck, into the relatively wide container body.

3. In the known method of testing milk which comprises dissolving the non-fat constituents in a solvent and the subjection of the mixed solution and fat, while contained in a container having a narrow, graduated, tubular neck, to centrifugal force, the process which comprises placing the container in an upright position with the body portion beneath, introducing the solvent through the narrow tubular neck of the container, and while the container remains in that position adding to the solvent a predetermined quantity of milk and effecting its admixture with the solvent by directing a fine jet of said milk, from a point within the container and distant from the open end of the graduated, tubular neck, toward the body of solvent.

In testimony of which invention, I have hereunto set my hand, at Stockholm, Sweden, on this 13th day of April, 1932.

ALF LENNART STIGEN.